US012812679B2

(12) United States Patent
Lauridsen et al.

(10) Patent No.: US 12,812,679 B2
(45) Date of Patent: Nov. 24, 2026

(54) DEVICES AND METHODS FOR REFINING COVERAGE WINDOW FOR DISCONTINUOUS COVERAGE

(71) Applicant: Nokia Technologies Oy, Espoo (FI)

(72) Inventors: Mads Lauridsen, Aalborg (DK); Srinivasan Selvaganapathy, Bangalore (IN); Ping Yuan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 282 days.

(21) Appl. No.: 18/701,858

(22) PCT Filed: Oct. 21, 2021

(86) PCT No.: PCT/CN2021/125304
§ 371 (c)(1),
(2) Date: Apr. 16, 2024

(87) PCT Pub. No.: WO2023/065215
PCT Pub. Date: Apr. 27, 2023

(65) Prior Publication Data
US 2024/0414764 A1 Dec. 12, 2024

(51) Int. Cl.
*H04W 74/0816* (2024.01)
*H04W 68/02* (2009.01)
*H04W 74/08* (2024.01)

(52) U.S. Cl.
CPC ....... *H04W 74/0816* (2013.01); *H04W 68/02* (2013.01); *H04W 74/0866* (2013.01)

(58) Field of Classification Search
None
See application file for complete search history.

(56) References Cited

U.S. PATENT DOCUMENTS 9,137,724 B1 * 9/2015 Sharma ............. H04W 28/0808
9,319,993 B1 * 4/2016 Urbanus ........... H04W 52/0258
2020/0413451 A1 12/2020 Taherzadeh Boroujeni et al.
(Continued)

FOREIGN PATENT DOCUMENTS

WO 2020/089438 A1 5/2020

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.4.0, Jun. 2021, pp. 1-64.
(Continued)

*Primary Examiner* — Robert M Morlan
(74) *Attorney, Agent, or Firm* — Nokia Technologies Oy

(57) ABSTRACT

Various example embodiments relate to devices and methods for refining a coverage window for discontinuous coverage. A terminal device may comprise at least one processor and at least one memory including computer program code. The at least one memory and the computer program code may be configured to, with the at least one processor, cause the terminal device to perform actions including determining a coverage window for receiving transmission from a network device, monitoring radio coverage of the network device at least during the coverage window, and updating the coverage window based on when the radio coverage is available for the terminal device.

19 Claims, 6 Drawing Sheets

(56) References Cited

U.S. PATENT DOCUMENTS

2021/0092781 A1* 3/2021 Lauridsen ............. H04W 24/02

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.5.0, Jun. 2021, pp. 1-1091.

"WID on NB-IoT/eMTC support for NTN", 3GPP TSG RAN Meeting #92-e, RP-211601, Agenda: 10.5.1, MediaTek Inc., Jun. 14-18, 2021, 6 pages.

"3rd Generation Partnership Project; Technical Specification Group Radio Access Network; Study on New Radio (NR) to support non-terrestrial networks (Release 15)", 3GPP TR 38.811, V15.4.0, Sep. 2020, pp. 1-127.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763, V17.0.0, Jun. 2021, pp. 1-73.

"On LEO satellite flyover timing and discontinuous coverage", 3GPP TSG-RAN WG2 Meeting #115-e, R2-2107453, Agenda: 9.2.2, Eutelsat, Aug. 9-27, 2021, pp. 1-4.

"On support of Non-continuous coverage", 3GPP TSG-RAN WG2 Meeting #115 Electronic, R2-2108116, Agenda: 9.2.2, Nokia, Aug. 16-27, 2021, 5 pages.

"On satellite pass predictions for UE wake-up management under discontinuous coverage", 3GPP TSG RAN WG2 meeting #114, R2-2104863, Agenda: 9.2.2, Sateliot, May 19-27, 2021, 3 pages.

"Essential adaptations for discontinuous coverage in IoT-NTN", 3GPP TSG RAN WG2 meeting #113b, R2-2102961, Agenda: 9.2.1, GateHouse Satcom, Apr. 12-20, 2021, 9 pages.

International Search Report and Written Opinion received for corresponding Patent Cooperation Treaty Application No. PCT/CN2021/125304, dated Jul. 19, 2022, 8 pages.

"On aspects of discontinuous coverage in IoT NTN", 3GPP TSG-RAN WG2 Meeting #116 Electronic, R2-2110705, Agenda: 9.2.2, Nokia, Nov. 1-12, 2021, 9 pages.

"Mobile-Termination with non-continuous coverage in NTN", 3GPP TSG RAN WG2 meeting #114, R2-2104862, Agenda: 9.2.2, GateHouse, May 19-27, 2021, 3 pages.

* cited by examiner

DEVICES AND METHODS FOR REFINING COVERAGE WINDOW FOR DISCONTINUOUS COVERAGE

RELATED APPLICATION

This application was originally filed as PCT Application No. PCT/CN2021/125304, filed on Oct. 21, 2021, of which priority is claimed and is incorporated herein by reference in its entirety.

TECHNICAL FIELD

Various example embodiments described herein generally relate to communication technologies, and more particularly, to devices and methods for refining a coverage window for discontinuous coverage in a non-terrestrial network (NTN).

BACKGROUND

Certain abbreviations that may be found in the description and/or in the figures are herewith defined as follows:

3GPP 3rd Generation Partnership Project
CSI-RS Channel State Information Reference Signal
DL Downlink
LEO Low Earth Orbit
MTC Machine-Type Communication
NB-IoT Narrow Band Internet of Things
gNB next Generation Node-B
NTN Non-Terrestrial Network
RS Reference Signal
RSRP Reference Signal Received Power
SSB Synchronization Signal Block 3GPP has started a work item on NB-IoT/eMTC support for non-terrestrial network (NTN) operations. For development of the NTN, low earth orbit (LEO) satellites have attracted much attention due to their apparent merits such as lower cost, better link budget and shorter delays compared to conventional geostationary satellites. Because the LEO satellites move with a high speed relative to Earth, a discontinuous coverage scenario would be expected.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a terminal device is provided. The terminal device may comprise at least one processor and at least one memory including computer program code. The at least one memory and the computer program code may be configured to, with the at least one processor, cause the terminal device to perform actions including determining a coverage window for receiving transmission from a network device, monitoring radio coverage of the network device at least during the coverage window, and updating the coverage window based on when the radio coverage is available for the terminal device.

In a second aspect, an example embodiment of a network device is provided. The network device may comprise at least one processor and at least one memory including computer program code. The at least one memory and the computer program code may be configured to, with the at least one processor, cause the network device to perform actions including paging a terminal device during a coverage window, determining an additional window when the paging fails during the coverage window, paging the terminal device during the additional window, and updating the coverage window to include the additional window when a paging response is received in response to the paging during the additional window.

Example embodiments of methods, apparatus and computer program products are also provided. Such example embodiments generally correspond to the above example embodiments of the terminal and network devices, and a repetitive description thereof is omitted here for convenience.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture. The base station may be deployed on the ground or in the sky, for example on a satellite, a high altitude platform station, an unmanned aircraft system, a balloon, an airplane, and/or the like.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

Figure 1:
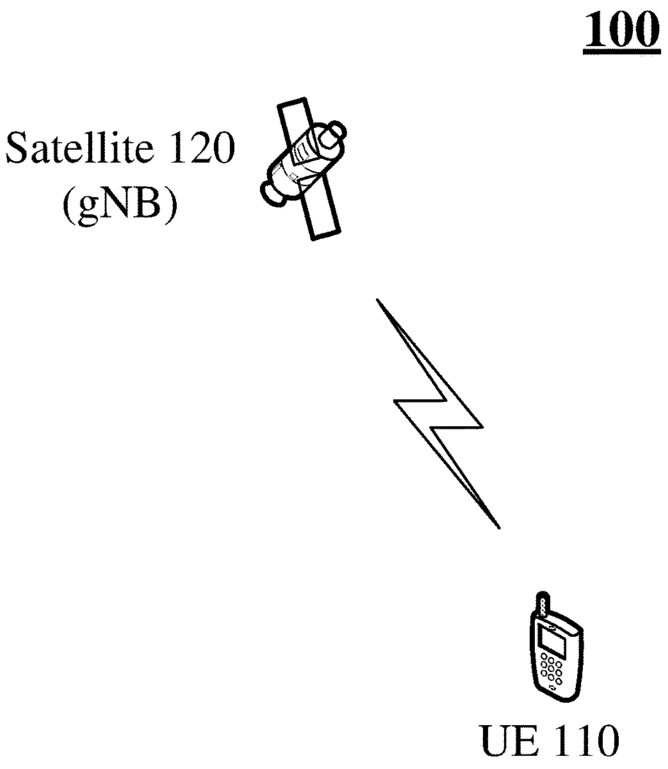
FIG. 1 is a schematic diagram illustrating a communication network in which example embodiments of the present disclosure may be implemented.

FIG. 1 is a schematic diagram illustrating a non-terrestrial network 100 in which example embodiments of the present disclosure may be implemented. Referring to FIG. 1, the non-terrestrial network (NTN) 100, which may form a part of a cellular communication network, may include one or more user equipment (UE) devices 110 (one is shown in FIG. 1) and one or more satellites 120 (one is shown in FIG. 1). The satellite 120 may be a low Earth orbit satellite or it may be replaced by e.g. an airplane, a balloon, a high altitude platform station, an unmanned aircraft system and/or the like.

The satellite 120 may be implemented as a so called regenerative satellite. The regenerative satellite may communicate with the UE 110 via a service link and communicate with a gateway on the ground (not shown) via a feeder link. The payload of the regenerative satellite may include a base station or at least a part of a base station to perform at least a part of functionalities of the base station. For example, if the satellite 120 includes a 5G NR base station named gNB onboard as shown in FIG. 1, the NR-Uu radio interface may be implemented on the service link, and the N2/N3 interface may be implemented on the feeder link. The regenerative satellite may implement regeneration of signals received from the UE 110 and the gateway on the ground. It would be appreciated that the satellite 120 may also be implemented as at least a part of a 4G LTE base station eNB or a beyond 5G base station.

For early phase deployment of larger constellations or for low-cost deployments, there are not many satellites deployed around Earth, and a discontinuous coverage scenario would be expected due to high speed moving of the satellites relative to Earth. To support the discontinuous coverage, it has been proposed that the UE and/or the network can predict a coverage window (also known as visibility duration) based on assistance information such as satellite ephemeris which defines an orbit, position and/or movement vector of the satellite. Predicting the coverage window will allow UE and the network to align the time when the UE is within coverage of the satellite/network, and the UE can monitor for paging from the network during the coverage window. Within an interval between the coverage windows, the UE may disable unnecessary operations for power saving.

However, the coverage window predicted at the UE or the network may be inaccurate. For example, current coverage window prediction algorithms do not take into consideration of UE movement, or a simple prediction algorithm is applied at the UE which would potentially lead to the UE predicting a coverage window that is not sufficiently aligned with an actual radio coverage. Therefore, there is still a need to refine the coverage window for better time alignment between the UE and the network.

Figure 2:
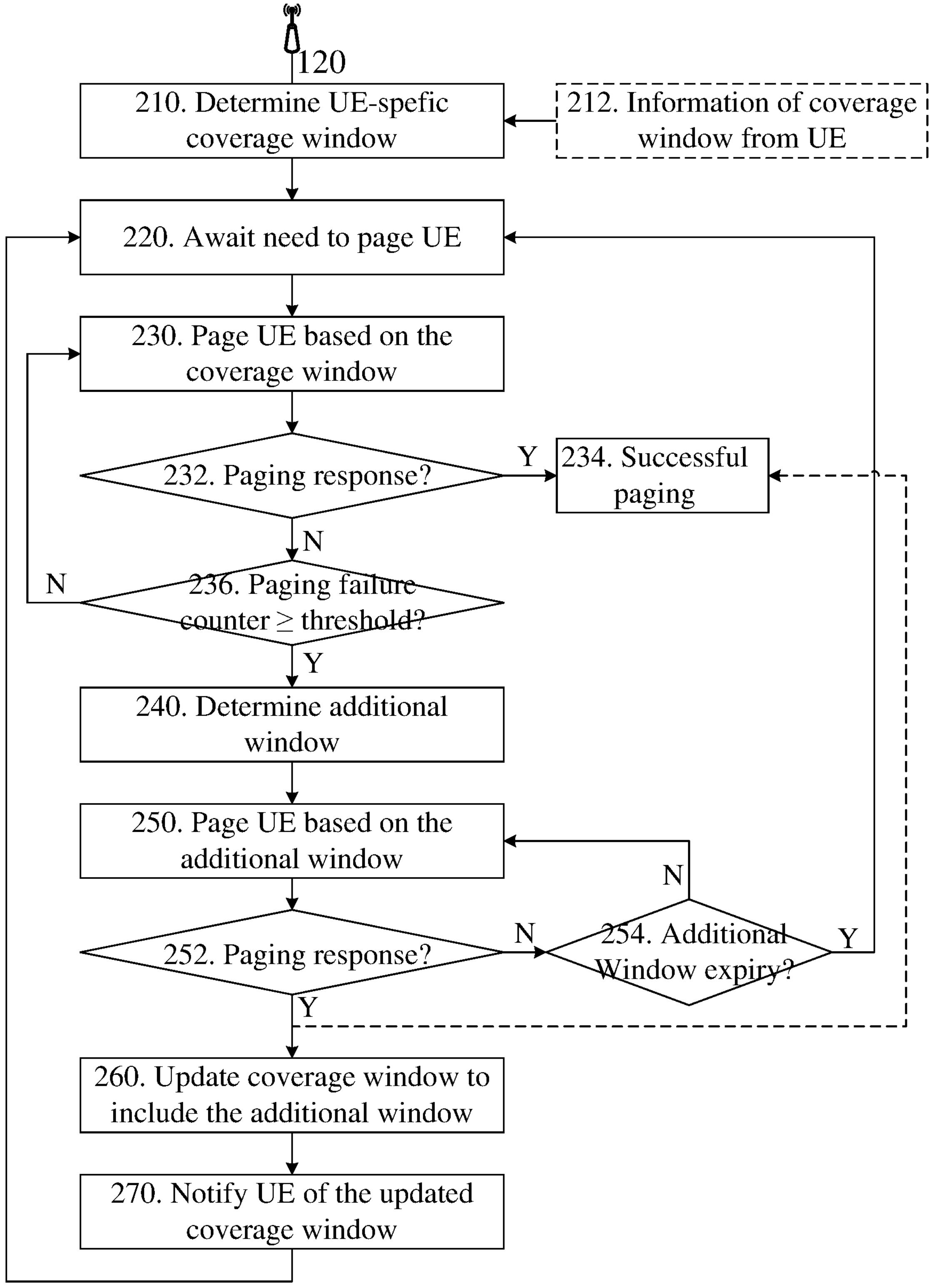
FIG. 2 is a schematic message flow diagram illustrating a procedure for refining a coverage window at the network side in accordance with some example embodiments.

FIG. 2 is a schematic message flow diagram illustrating a procedure for updating a coverage window at the network side in accordance with some example embodiments. The procedure shown in FIG. 2 may be performed by a base station deployed in the non-terrestrial network (NTN), for example the base station 120 at least a part of which is implemented on a satellite as shown in FIG. 1. In some example embodiments, the base stations 120 may include a plurality of means, modules or elements for performing the operations discussed below with reference to FIG. 2. The means, modules and elements may be implemented in various manners including but not limited to for example software, hardware, firmware or any combination thereof to perform the operations.

Referring to FIG. 2, at 210, the base station 120 may determine a UE-specific coverage window for e.g. the UE 110. The base station 120 may predict the coverage window based on for example UE information such as UE location, UE capabilities and NTN assistance information such as satellite ephemeris which defines the orbit of the satellite or the satellite's posture, position and movement vector. The base station 120 may apply algorithms to estimate the coverage window based on the above or additional information.

In some example embodiments, the base station 120 may receive information for determining the coverage window directly or indirectly from the UE 110 at 212. The information may include for example the latest UE information such as location and capabilities for predicting the coverage window. In some example embodiments, as discussed below in detail, the UE 110 may adjust/update the predicted coverage window by measuring a radio coverage period of the base station 120 and notify the base station 120 of the adjusted/updated coverage window. In such a case, the base station 120 may determine the coverage window taking into consideration of the adjustment/update made by the UE 110 to the predicted coverage window.

Figure 3:
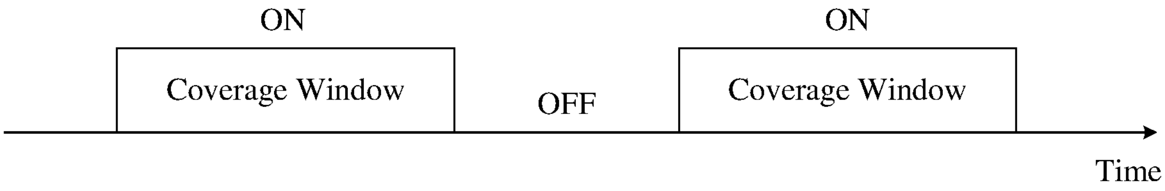
FIG. 3 is a schematic diagram illustrating a coverage window including an ON duration.

FIG. 3 shows an example of the coverage window determined at the operation 210. Referring to FIG. 3, the coverage window may comprise an ON duration in which the base station 120 is visible to the UE 110, i.e., the UE 110 can communicate with the base station 120. In an OFF duration between two ON durations, it is estimated that the base station 120 is invisible to the UE 110, i.e., the UE 110 cannot communicate with the base station 120. It would be appreciated that the base station 120 can determine a sequence of ON durations (coverage windows) in the operation 210.

At 220, the base station 120 may await a need to page the UE 110. For example, when the base station 120 has downlink data for the UE 110 or it needs to update network information to the UE 110, the base station 120 may decide that there is a need to page the UE 110.

Then at 230, the base station 120 may page the UE 110 based on the UE-specific coverage window determined at the operation 210. Before the coverage window, the base station 120 may not page the UE 110 because it may be invisible to the UE 110. At 232, the base station 120 may determine if a paging response is received from the UE 110. If the base station 120 receives the paging response from the UE 110, the paging ends successfully at 234. The base station 120 and the UE 110 may establish an RRC connection to exchange data, or the base station 120 may await a next need to page the UE 110.

If the paging is failed and the base station 120 does not receive any response from the paged UE 110, the base station 120 may decide a paging failure and increases a paging failure counter by one. The base station 120 may determine if the paging failure counter value reaches a predetermined threshold at 236. If the paging failure counter value is less than the threshold, the base station 120 may attempt to page the UE 110 again in the operation 230 until the paging successes or the paging failure counter value equals to the threshold.

When the paging failure counter value is equal to or larger than the threshold, the base station 120 may determine an additional window at 240. Here, it would be appreciated that the base station 120 may stop paging the UE 110 and reset the paging failure counter when it fails for the threshold number of times or the base station 120 may keep paging the UE 110 and increase the paging failure counter until a successful paging or expiry of the current coverage window. In some example embodiments, the threshold and the operation 236 may be omitted, and the base station 120 may page the UE 110 if needed until expiry of the coverage window. The additional window determined at 240 may have a length that may be configured by the network, have a predetermined fixed value such as a certain number of paging cycles, or be a function of the number of paging failures during the coverage window. For example, if the paging fails for 1 to X1 times, the additional window has a length Y1; if the paging fails for (X1+1) to X2 times where X2>X1, the additional window has a length Y2 where Y2>Y1, and so on.

Figure 4:
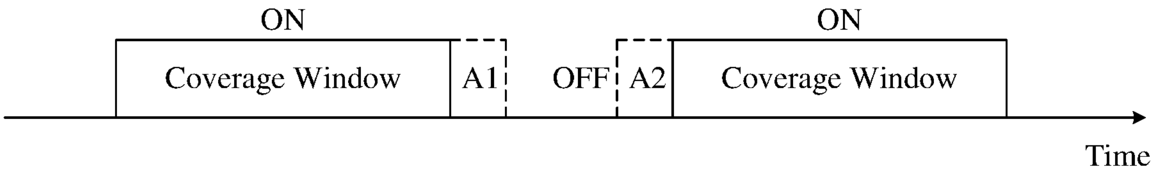
FIG. 4 is a schematic diagram illustrating a coverage window and an additional window in accordance with some example embodiments.

FIG. 4 shows some examples of the additional window determined at the operation 240. Referring to FIG. 4, the additional window may include one or both of a first additional window A1 posterior to the current coverage window and a second additional window A2 prior to the next coverage window. In some example embodiments, the additional window may include both of the first and second additional windows A1, A2 when the paging is failed for one or more times during the coverage window, regardless of the number of paging failures and the time position of the paging failures in the coverage window. In some example embodiments, if the paging fails at the beginning (e.g., the first quarter) or a first half of the coverage window, the base station 120 may estimate that the actual coverage window shifts forward on the time axis relative to the predicted coverage window and determine the additional window including the first additional window A1 posterior to the current coverage window. On the other hand, if the paging fails at the end (e.g., the last quarter) or a second half of the coverage window, the base station 120 may estimate that the actual coverage window shifts backward on the time axis relative to the predicted coverage window and determine the additional window including the second additional window A2 prior to the next coverage window. It would be appreciated that the additional window may be determined by other rules and it is not limited to the above examples.

Referring back to FIG. 2, at 250, the base station 120 may page the UE 110 based on the additional window determined at the operation 240. If the base station 120 does not receive a paging response from the UE 110 at 252 and the additional window has not expired at 254, the base station 120 may go back to the operation 250 and page the UE 110 again based on the additional window until expiry of the additional window. If the base station 120 does not receive a paging response from the UE 110 till expiry of the additional window, the procedure may go back to the operation 220 where the base station 120 awaits for a next need to page the UE 110.

If the base station 120 receives a paging response from the UE 110 during the additional window, in some example embodiments, the paging may end successfully in 234. By paging in the additional window, the network can increase success chance of the paging. In some example embodiments, the base station 120 may further update the coverage window to include the additional window at 260. The base station 120 may update the coverage window by shifting or extending/expanding it to include the additional window. For example, if a paging response is received in the first additional window A1, the base station 120 may shift or extend/expand the coverage window forward to include the first additional window A1. If a paging response is received in the second additional window A2, the base station 120 may shift or extend/expand the coverage window backward to include the second additional window A2. If paging responses are received in both the first additional window A1 and the second additional window A2, the base station 120 may extend/expand the coverage window in both directions to include the first additional window A1 and the second additional window A2.

At 270, the base station 120 may also notify the UE 110 of the updated coverage window to align in time with the UE 110. For example, the base station 120 may establish a connection with the UE 110 and send information of the updated coverage window (represented by an absolute value or a relative update value) to the UE 110 via RRC signaling, medium access control element (MAC CE) or Layer 1 signaling. When the base station 120 has transmitted/received DL/UL data to/from the UE 110 and there is no data exchange between the base station 120 and the UE 110, the base station 120 may put the UE 110 in an idle or inactive state and await for a next need to page the UE 110. In some example embodiments, the base station 120 may notify the UE 110 of the updated coverage window by using for example spare/reserved bits in downlink control information (DCI) for the paging (paging DCI) or a field in a paging record. In some example embodiments, the base station 120 may indicate the updated coverage window to the UE 110 by small data transmission (SDT) and/or early data transmission (EDT). It would be appreciated that the base station 120 may also notify the UE 110 of the updated coverage window in other ways.

In some example embodiments, the coverage window update notification may be triggered when the updated coverage window differs from the original/predicted coverage window by an amount equal to or higher than a threshold. For example, the original/predicted coverage window may be updated through the operations 210-260 for a number of times. When the difference between the original/predicted coverage window and the latest updated coverage window, such as a difference between the starting points thereof, a difference between the end points thereof, and/or a difference between the lengths thereof, accumulates up to an amount equal to or higher than a predetermined threshold, the base station 120 may trigger the coverage window update notification to the UE 110. It can reduce frequent transmissions between the UE 110 and the base station 120 and save power consumption at the base station 120.

Figure 5:
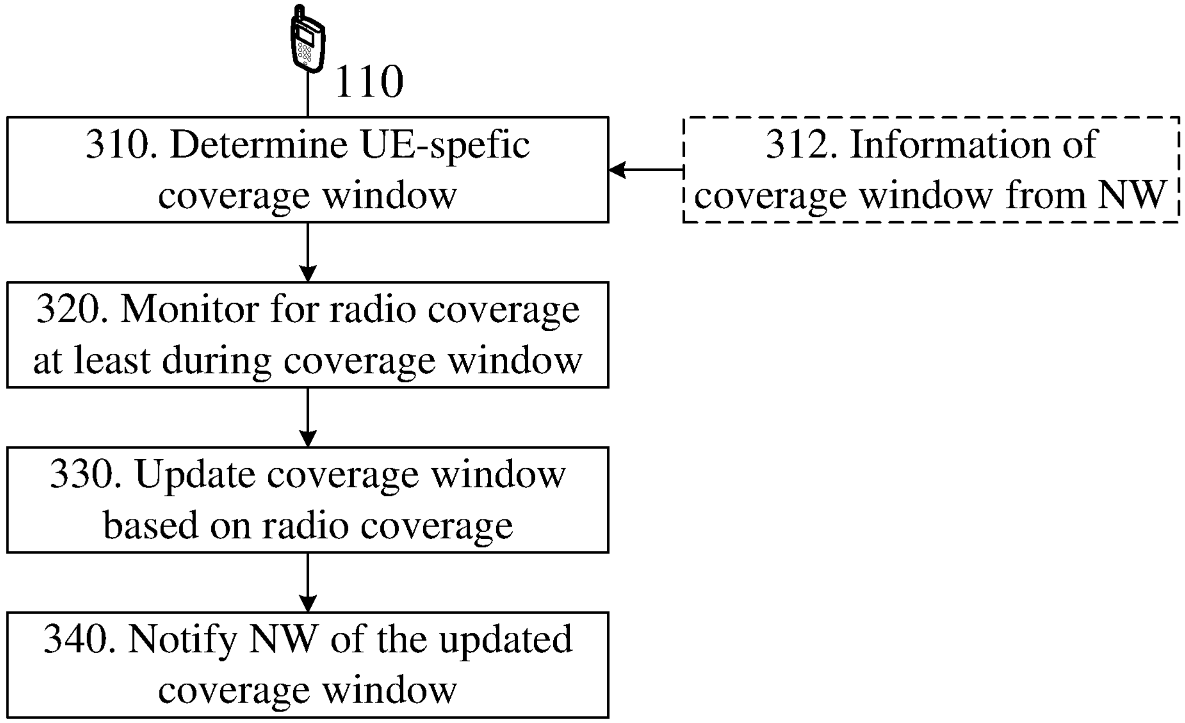
FIG. 5 is a schematic message flow diagram illustrating a procedure for refining a coverage window at the user equipment side in accordance with some example embodiments.

FIG. 5 is a schematic message flow diagram illustrating a procedure for updating a coverage window at the user equipment side in accordance with some example embodiments. The procedure shown in FIG. 5 may be performed by user equipment in communication with a non-terrestrial network (NTN), for example by the UE 110 in communication with the base station 120 at least a part of which is implemented on a satellite as shown in FIG. 1. In some example embodiments, the UE 110 may include a plurality of means, modules or elements for performing the operations discussed below with reference to FIG. 5. The means, modules and elements may be implemented in various manners including but not limited to for example software, hardware, firmware or any combination thereof to perform the operations.

Referring to FIG. 5, at 310, the UE 110 may determine a UE-specific coverage window. The UE 110 may predict the coverage window based on for example UE information such as UE location, UE capabilities and NTN assistance information such as satellite ephemeris which defines the orbit of the satellite or the satellite's posture, position and movement vector. The UE 110 may apply algorithms to estimate the coverage window based on the above or additional information.

In some example embodiments, the UE 110 may receive information for determining the coverage window from the network at 312. The information may include for example the satellite ephemeris for predicting the coverage window. In some example embodiments, as discussed above, the base station 120 may adjust/update the predicted coverage window by paging the UE 110 and notify the UE 110 of the adjusted/updated coverage window. In such a case, the UE 110 may determine the coverage window taking into consideration of the adjustment/update made by the base station 120 to the predicted coverage window.

At 320, the UE 110 may monitor for radio coverage of the base station (satellite) 120 at least during the coverage window. The UE 110 may monitor for the radio coverage for example by measuring DL reference signals (RSs) such as synchronization signal block (SSB) and/or channel state information reference signal (CSI-RS) transmitted from the base station 120. If the reference signal received power (RSRP) is equal to or higher than a threshold level, the UE 110 may determine that the radio coverage is available.

Figure 6A:
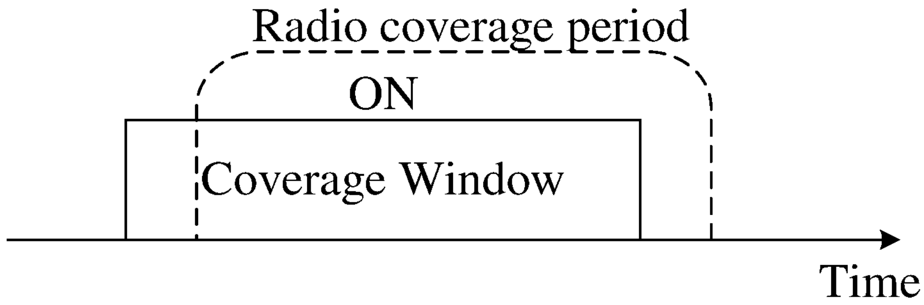
FIGS. 6A, 6B and 6C are schematic diagrams illustrating examples of monitoring for radio coverage at least during a coverage window in accordance with some example embodiments.
Figure 6B:
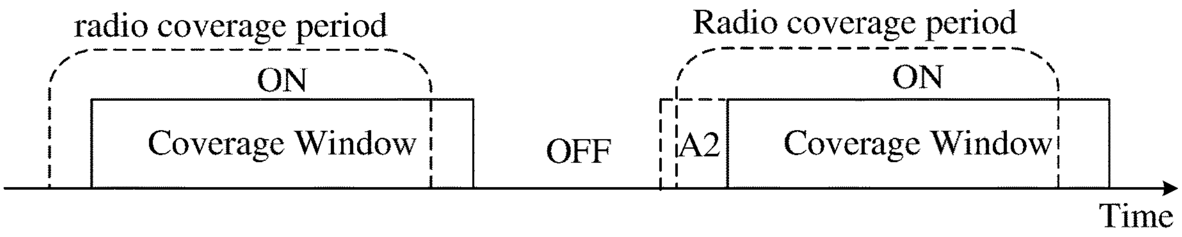
Figure 6C:
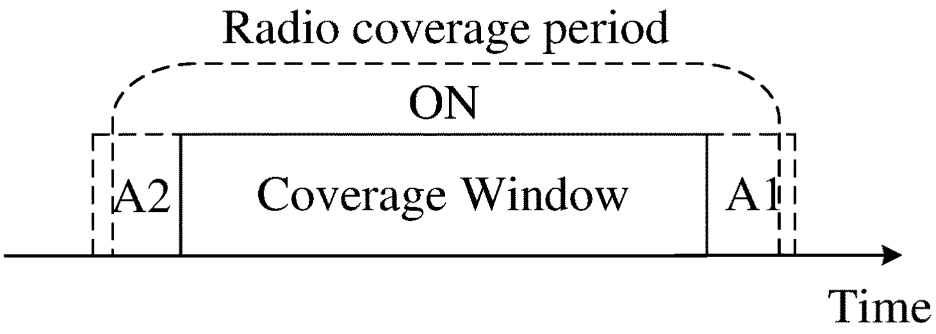

FIGS. 6A-6C show some examples of monitoring for the radio coverage. Referring to FIG. 6A, in some example embodiments, the UE 110 may monitor for the radio coverage during the coverage window. If the radio coverage is available at the end of the coverage window, the UE 110 may keep monitoring the radio coverage until the radio coverage becomes unavailable, i.e., the RSRP of the DL RSs becomes lower than the threshold level. Referring to FIG. 6B, if the radio coverage becomes unavailable before the end of the coverage window, the UE 110 may monitor the radio coverage in an additional window A2 prior to the next coverage window. The additional window A2 may have a length that is pre-configured/predefined/predetermined or is a function of a timing difference between the end of the radio coverage measured in the previous coverage window and the end of the coverage window. Using the additional window, the UE 110 may determine a full period of the radio coverage. In some example embodiments, as shown in FIG. 6C, the UE 110 may monitor for the radio coverage during the coverage window and at least one of a first additional window A1 posterior to the coverage window and a second additional window A2 prior to the coverage window. The first and second additional windows A1, A2 may have a network configured or predefined length for example a number of paging cycles or a period of time. FIGS. 6A, 6B and 6C show some examples of the radio coverage period determined at the operation 320. It would be appreciated that the UE 110 may monitor the radio coverage by other rules and it is not limited to the above examples.

Referring back to FIG. 5, at 330, the UE 110 may update the coverage window based on when the radio coverage is available. For example, the UE 110 may use the radio coverage period i.e. a time window during which the radio coverage is available to the UE 110 as the coverage window. In some example embodiment, the UE 110 may update the coverage window using the radio coverage period when the radio coverage period is longer or shorter than the coverage window by a threshold or more. As another example, the UE 110 may update the coverage window using the radio coverage period when the radio coverage period is shifted relative to the coverage window by a threshold or more. In some example embodiments, when the UE 110 is moving with a high speed and/or it has moved a threshold long distance from the location where it calculates/predicts the coverage window in the operation 310, the UE 110 may re-calculate/re-predict the coverage window based on the satellite ephemeris before it updates the coverage window based on the radio coverage period at the operation 330.

At 340, the UE 110 may notify the base station 120 of the updated coverage window to align in time with the base station 120. In some example embodiments, the coverage window update notification may be triggered when the updated coverage window differs from the original/predicted coverage window by an amount equal to or higher than a threshold. For example, the original/predicted coverage window may be updated through the operations 310-330 for a number of times. When the difference between the original/predicted coverage window and the latest updated coverage window, such as a difference between the starting points thereof, a difference between the end points thereof, and/or a difference between the lengths thereof, accumulates up to an amount equal to or higher than a predetermined threshold, the UE 110 may trigger the coverage window update notification to the base station 120. It can reduce frequent transmissions between the UE 110 and the network and save power consumption at the UE 110.

In some example embodiments, at the operation 340, the UE 110 may establish a connection with the base station 120 and send information of the updated coverage window (represented by an absolute value or a relative update value) to the base station 120 via RRC signaling, medium access control element (MAC CE) or Layer 1 signaling. When the UE 110 has transmitted/received UL/DL data to/from the UE 110 and there is no data exchange between the base station 120 and the base station 120, the UE 110 may transition to an idle or inactive state and monitor paging from the network. In some example embodiments, the UE 110 may notify the base station 120 of the updated coverage window by using for example spare/reserved bits in a paging response. In some example embodiments, the UE 110 may indicate the updated coverage window to the base station 120 by small data transmission (SDT) and/or early data transmission (EDT). It would be appreciated that the UE 110 may also notify the base station 120 of the updated coverage window in other ways.

Figure 7:
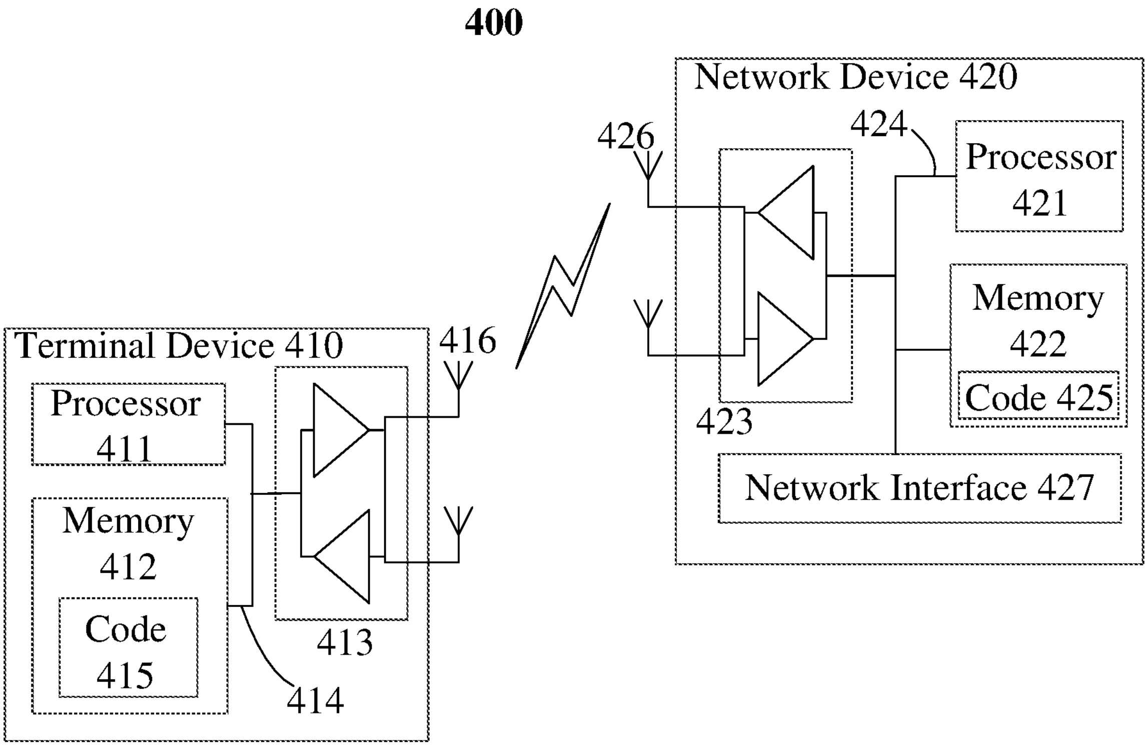
FIG. 7 is a schematic block diagram illustrating devices in a communication network in which example embodiments of the present disclosure may be implemented.

FIG. 7 is a block diagram illustrating a communication system 400 in which example embodiments of the present disclosure can be implemented. The communication system

400 may be a part of a communication network such as a non-terrestrial network. As shown in FIG. 7, the communication system 400 may include a terminal device 410 which may be implemented as the UE 110 discussed above, and a network device 420 which may be implemented as the base station 120 discussed above.

Referring to FIG. 7, the terminal device 410 may comprise one or more processors 411, one or more memories 412 and one or more transceivers 413 interconnected through one or more buses 414. The one or more buses 414 may be address, data, or control buses, and may include any interconnection mechanism such as series of lines on a motherboard or integrated circuit, copper cables, optical fibers, or other electrical/optical communication equipment, and the like. Each of the one or more transceivers 413 may comprise a receiver and a transmitter, which are connected to a plurality of antennas 416. The plurality of antennas 416 may form an antenna array to perform beamforming communication with the network device 420. The one or more memories 412 may include computer program code 415. The one or more memories 412 and the computer program code 415 may be configured to, when executed by the one or more processors 411, cause the terminal device 410 to perform procedures and steps relating to the UE 110 as described above.

The network device 420 can be implemented as a single network node, or disaggregated/distributed over two or more network nodes, such as a central unit (CU), a distributed unit (DU), a remote radio head-end (RRH), using different functional-split architectures and different interfaces. The network device 420 may comprise one or more processors 421, one or more memories 422, one or more transceivers 423 and one or more network interfaces 427 interconnected through one or more buses 424. The one or more buses 424 may be address, data, or control buses, and may include any interconnection mechanism such as a series of lines on a motherboard or integrated circuit, copper cables, optical fibers, or other electrical/optical communication equipment, and the like. Each of the one or more transceivers 423 may comprise a receiver and a transmitter, which are connected to a plurality of antennas 426. The network device 420 may operate as a base station for the terminal device 410 and wirelessly communicate with the terminal device 410 through the plurality of antennas 426. The plurality of antennas 426 may form an antenna array to perform beamforming communication with the terminal device 410. The one or more network interfaces 427 may provide wired or wireless communication links through which the network device 420 may communicate with other network devices, entities or functions. The one or more memories 422 may include computer program code 425. The one or more memories 422 and the computer program code 425 may be configured to, when executed by the one or more processors 421, cause the network device 420 to perform procedures and steps relating to the base station 120 as described above.

The one or more processors 411, 421 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 411, 421 may be configured to control other elements of the UE/network device and operate in cooperation with them to implement the procedures discussed above.

The one or more memories 412, 422 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 412, 422 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some example embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some example embodiments further provide computer program code or instructions which, when executed by one or more processors, may cause a device or apparatus to perform the procedures described above. The computer program code for carrying out procedures of the example embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some example embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A terminal device comprising:

at least one processor; and at least one memory including computer program code, the at least one memory and the computer program code being configured to, with the at least one processor, cause the terminal device to perform:

determining a coverage window for receiving transmission from a network device;

monitoring radio coverage of the network device at least during the coverage window;

updating the coverage window based on when the radio coverage is available for the terminal device; and notifying the network device of the updated coverage window when the updated coverage window differs from the determined coverage window by an amount equal to or higher than a threshold.

2. The terminal device of claim 1 wherein monitoring radio coverage of the network device at least during the coverage window comprises:

monitoring the radio coverage during the coverage window and at least one of a first additional window posterior to the coverage window and a second additional window prior to the coverage window.

3. The terminal device of claim 1 wherein monitoring radio coverage of the network device at least during the coverage window comprises:

monitoring the radio coverage until the radio coverage becomes unavailable when the radio coverage is available at the end of the coverage window.

4. The terminal device of claim 1 wherein monitoring radio coverage of the network device at least during the coverage window comprises:

monitoring the radio coverage during an additional window prior to a next coverage window when the radio coverage becomes unavailable before the end of the current coverage window.

5. The terminal device of claim 1 wherein updating the coverage window based on when the radio coverage is available for the terminal device comprises:

updating the coverage window with a time window during which the radio coverage is available for the terminal device when the time window is shifted relative to or longer or shorter than the coverage window by a threshold or more.

6. The terminal device of claim 1 wherein information of the updated coverage window is represented by an absolute value or a relative updated value.

7. A network device comprising:

at least one processor; and at least one memory including computer program code, the at least one memory and the computer program code being configured to, with the at least one processor, cause the network device to perform:

paging a terminal device during a coverage window;

determining an additional window when the paging fails during the coverage window; paging the terminal device during the additional window; and updating the coverage window to include the additional window when a paging response is received in response to the paging during the additional window.

8. The network device of claim 7 wherein the additional window comprises:

a first additional window posterior to the current coverage window; and/or a second additional window prior to a next coverage window.

9. The network device of claim 7 wherein determining an additional window when the paging fails comprises:

determining a first additional window posterior to the current coverage window when the paging fails at the beginning or a first half of the coverage window; and/or determining a second additional window prior to a next coverage window when the paging fails at the end or a second half of the coverage window.

10. The network device of claim 7 wherein the additional window is determined when the paging fails for a threshold number of times.

11. The network device of claim 7 wherein updating the coverage window to include the additional window comprises:

shifting the coverage window to include the additional window; or extending the coverage window to include the additional window.

12. The network device of claim 7 wherein the at least one memory and the computer program code are further configured to, with the at least one processor, cause the network device to perform:

notifying the terminal device of the updated coverage window.

13. The network device of claim 12 wherein the updated coverage window is notified to the terminal device when the updated coverage window differs from the determined coverage window by an amount equal to or higher than a threshold.

14. A method implemented at a terminal device comprising:

determining a coverage window for receiving transmission from a network device; monitoring radio coverage of the network device at least during the coverage window; updating the coverage window based on when the radio coverage is available for the terminal device; and notifying the network device of the updated coverage window when the updated coverage window differs from the determined coverage window by an amount equal to or higher than a threshold.

15. The method of claim 14 wherein monitoring radio coverage of the network device at least during the coverage window comprises:

monitoring the radio coverage during the coverage window and at least one of a first additional window posterior to the coverage window and a second additional window prior to the coverage window.

16. The method of claim 14 wherein monitoring radio coverage of the network device at least during the coverage window comprises:

monitoring the radio coverage until the radio coverage becomes unavailable when the radio coverage is available at the end of the coverage window.

17. The method of claim 14 wherein monitoring radio coverage of the network device at least during the coverage window comprises:

monitoring the radio coverage during an additional window prior to a next coverage window when the radio coverage becomes unavailable before the end of the current coverage window.

18. The method of claim 14 wherein updating the coverage window based on when the radio coverage is available for the terminal device comprises:

updating the coverage window with a time window during which the radio coverage is available for the terminal device when the time window is shifted relative to or longer or shorter than the coverage window by a threshold or more.

19. The method of claim 14 further comprising:

notify the network device of the updated coverage window, wherein information of the updated coverage window is represented by an absolute value or a relative updated value.

* * * * *